Nov. 17, 1970  A. R. DAVIS  3,541,433
CURRENT SUPPLY APPARATUSES WITH AN INDUCTIVE WINDING AND
HEAT SINK FOR SOLID STATE DEVICES
Filed Nov. 12, 1968  6 Sheets-Sheet 1
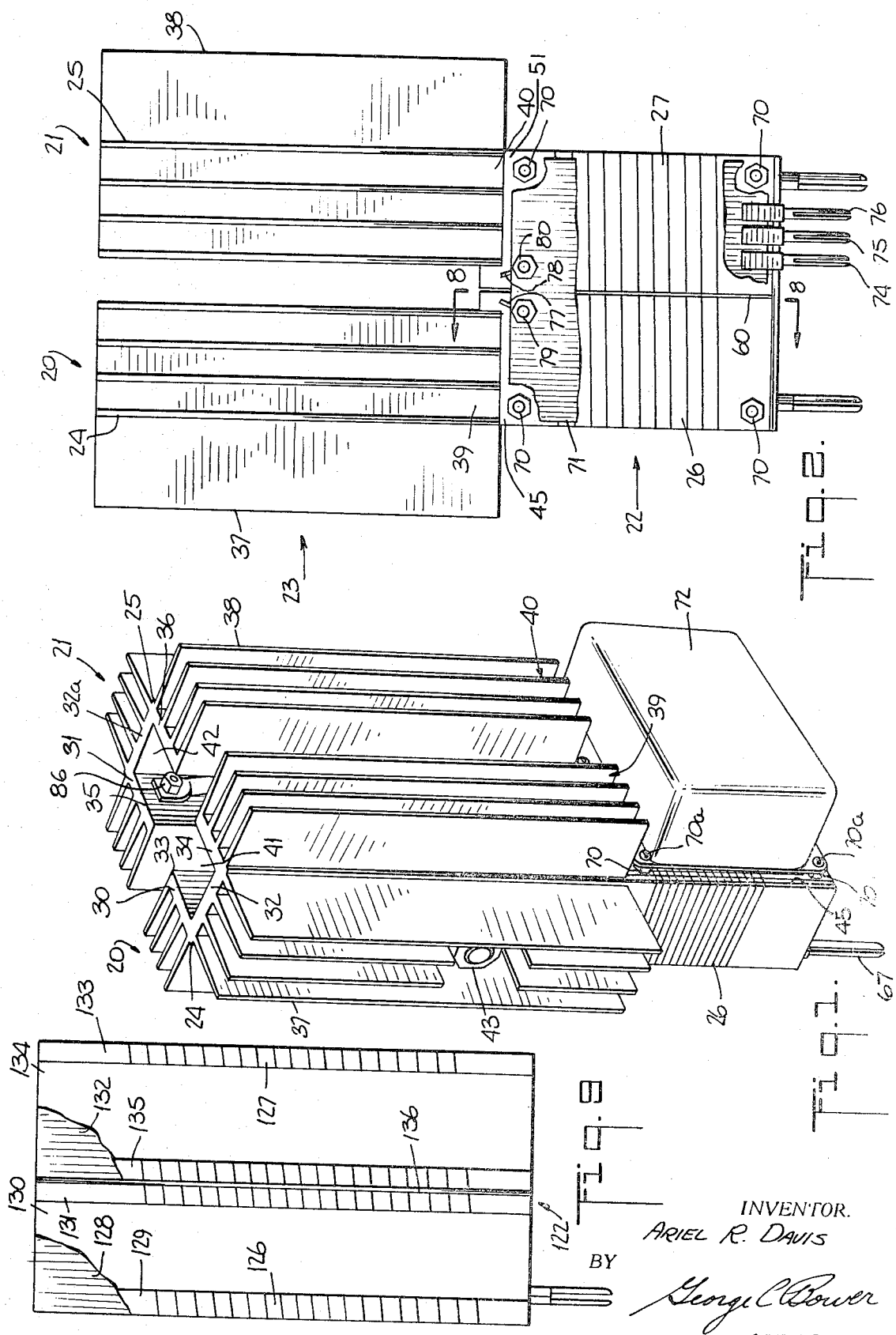
INVENTOR.
ARIEL R. DAVIS
BY
George C. Bower
ATTORNEY

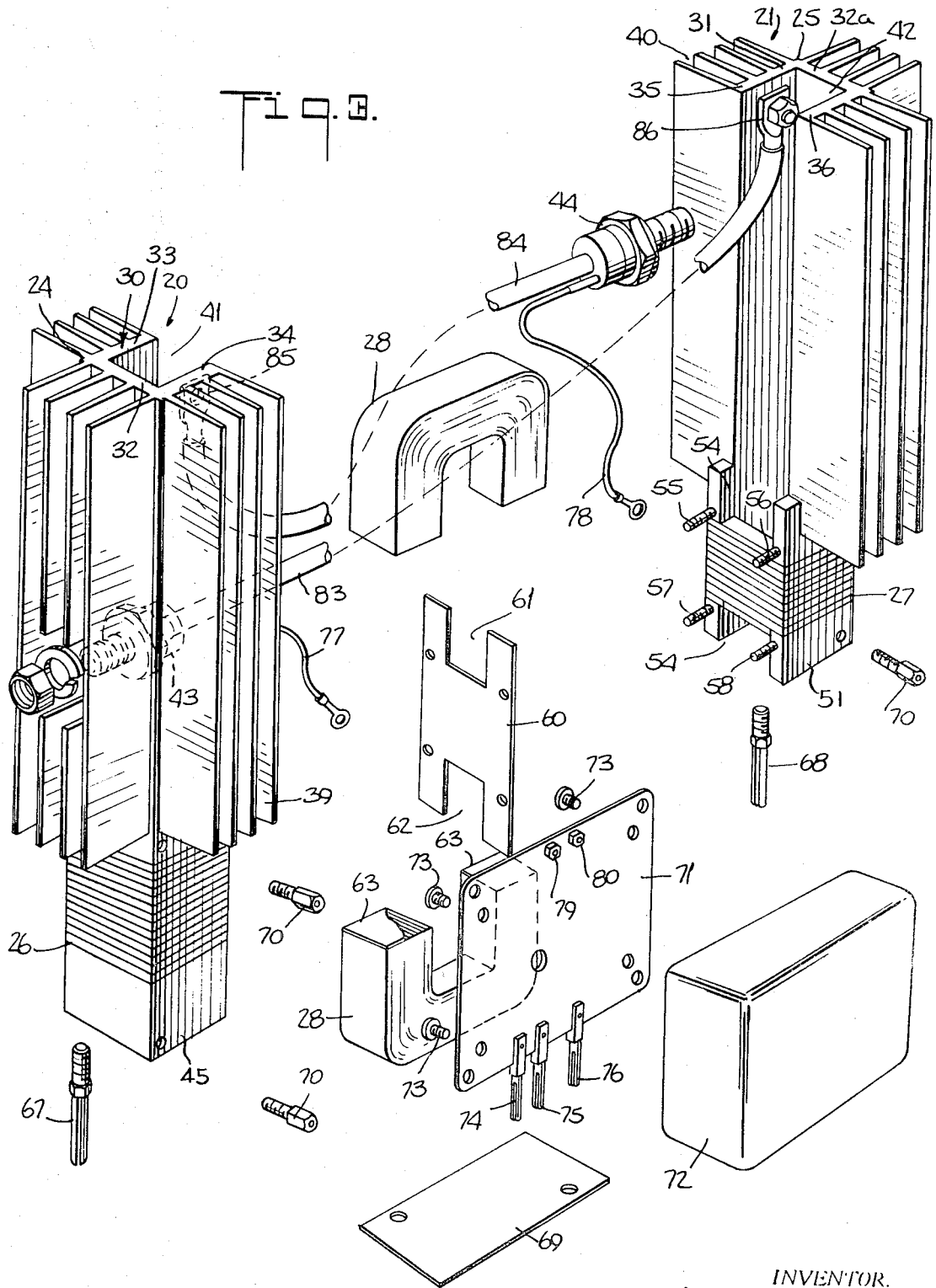

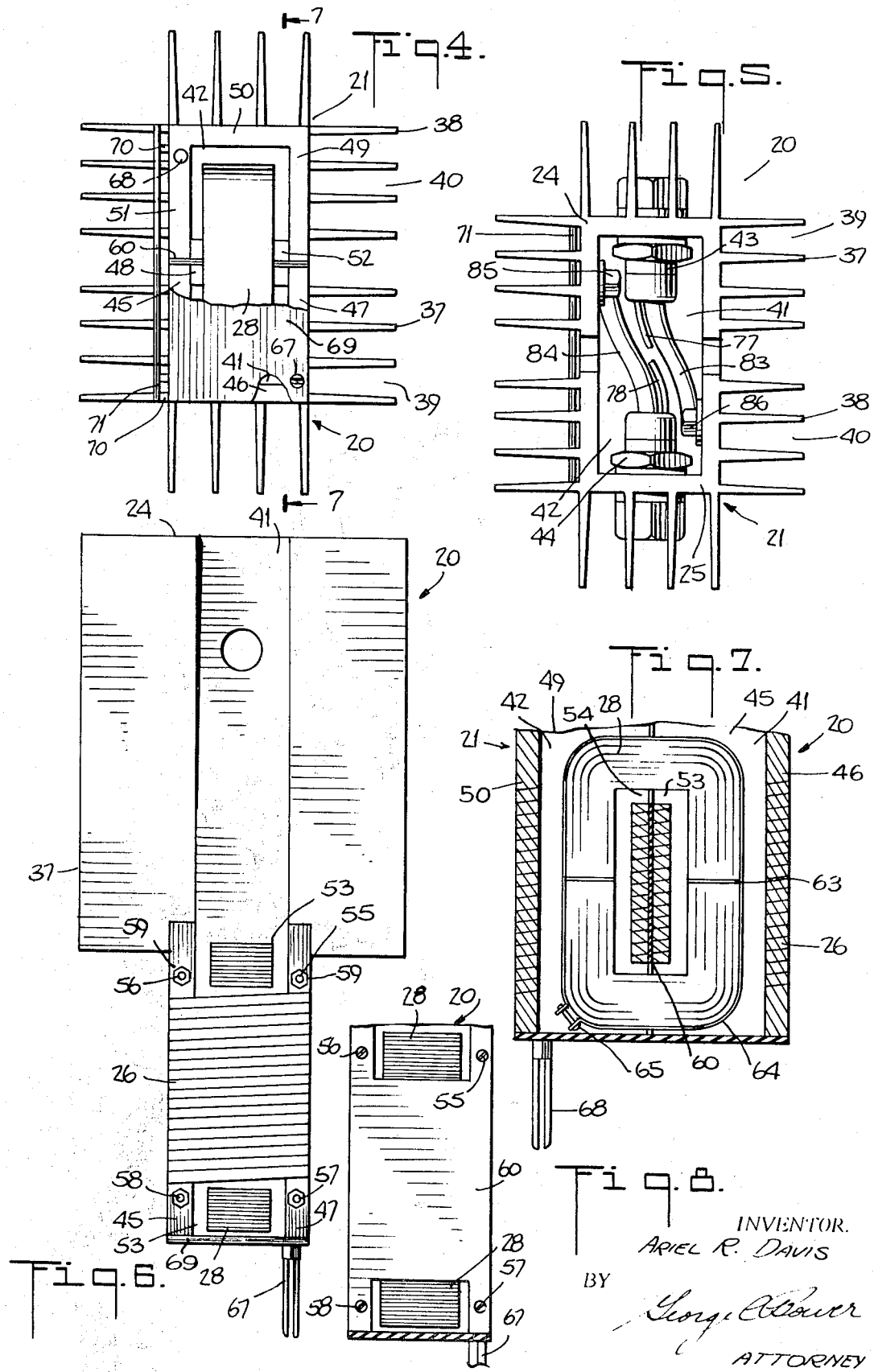

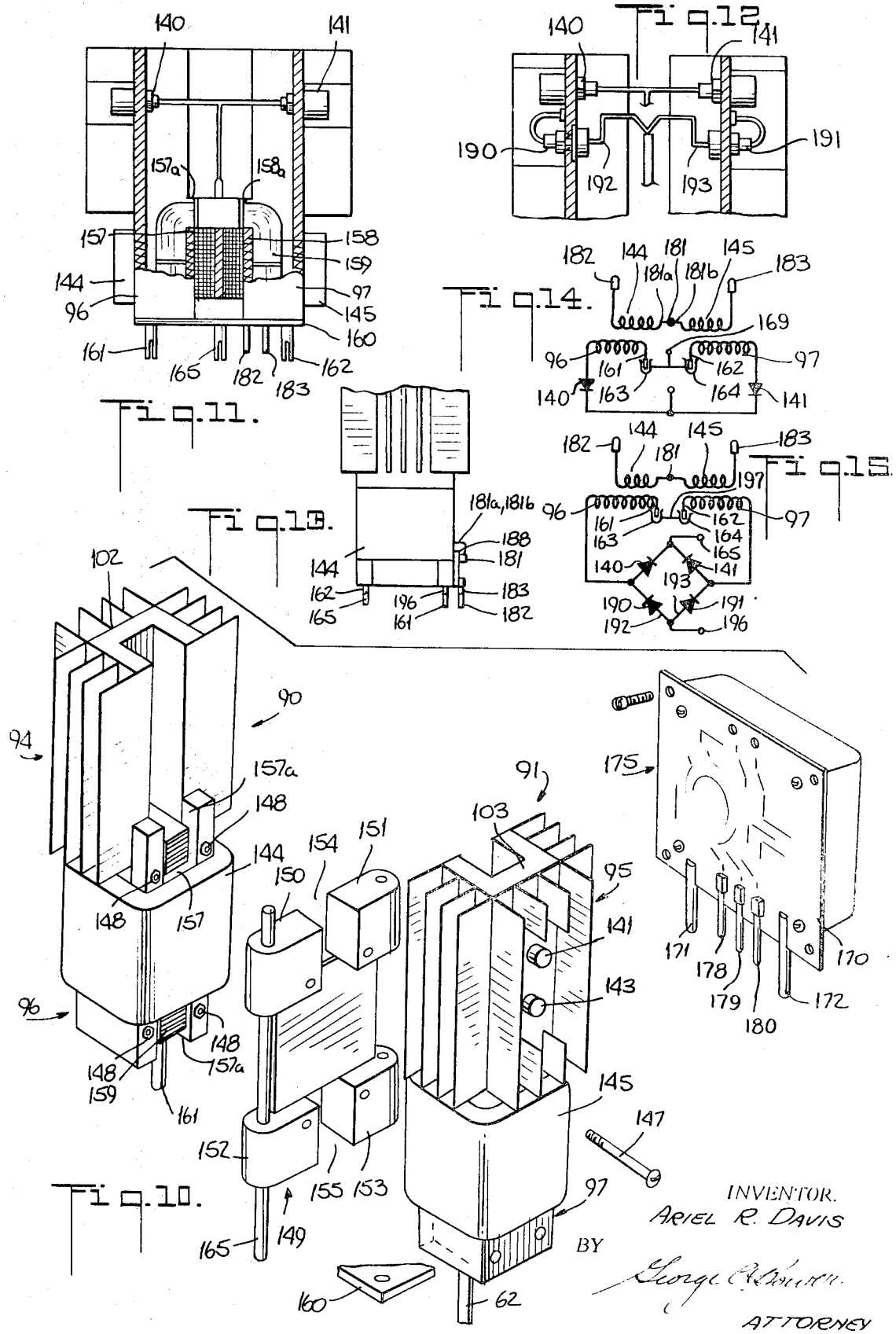

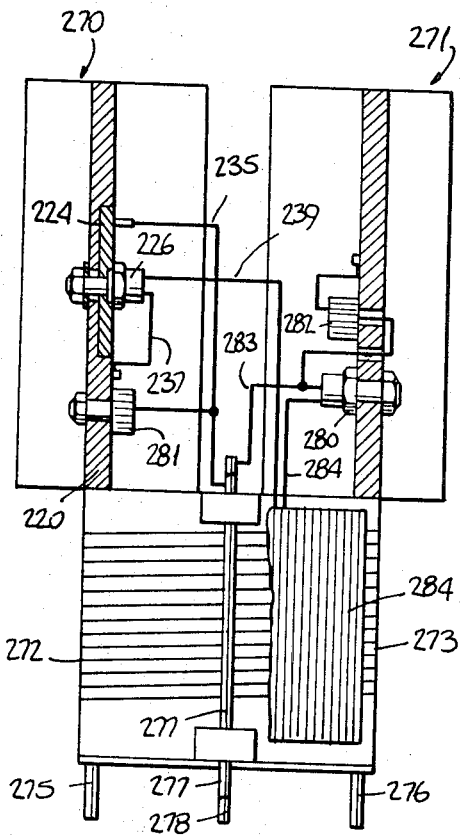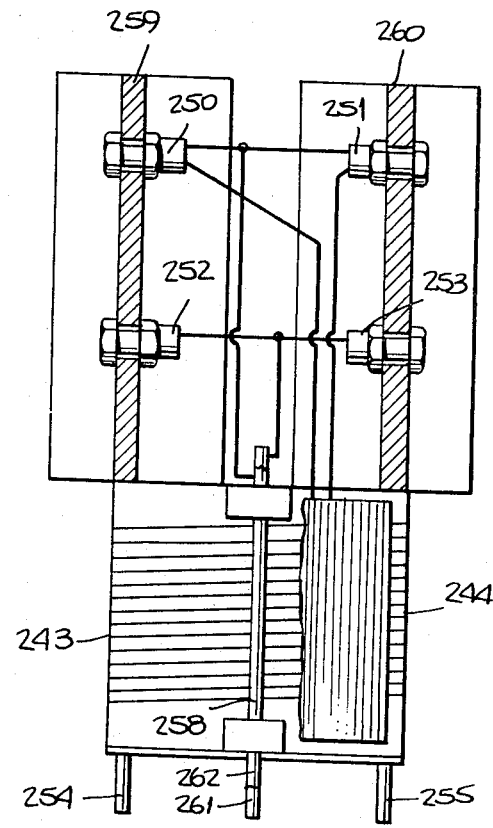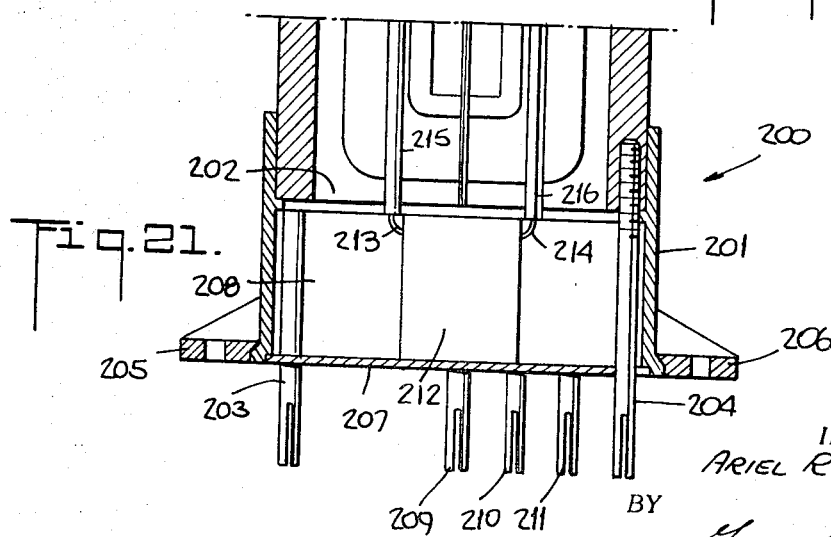

United States Patent Office 3,541,433
Patented Nov. 17, 1970

3,541,433
CURRENT SUPPLY APPARATUSES WITH AN INDUCTIVE WINDING AND HEAT SINK FOR SOLID STATE DEVICES
Ariel R. Davis, 3476 Fleetwood Drive,
Salt Lake City, Utah 84109
Filed Nov. 12, 1968, Ser. No. 775,014
Int. Cl. H01f 27/08
U.S. Cl. 323—17                                    15 Claims

ABSTRACT OF THE DISCLOSURE

An aluminum support member is extruded as a single piece with a generally tubular shaped wall having a portion with exterior fins forming a heat sink and a portion forming an inductive winding. Two members are surface insulated and are, at the windings, fastened side by side in electrical isolation with an air or iron core flux path. Solid state devices, such as rectifiers and controlled rectifiers, may be mounted in the heat sink for conducting current passing through the winding and heat sink. Firing circuits may be mounted on the end terminals of the windings for the phase control or timing of the conduction of controlled rectifiers to vary the amount of current passed. The support member may be used in inverters, converters and the like. In other embodiments the inductive windings may function as the secondary windings of a transformer. The primary windings are wound around the outside of the inductive windings. Rectifiers are mounted on the heat sinks to provide a direct current output and the primaries may be connected in series with controlled rectifiers to provide a variable direct current output.

RELATED APPLICATIONS

This relates to my co-pending patent application Ser. No. 784,979, filed Nov. 12, 1968 and entitled "Inductive Winding and Method of Manufacture."

BACKGROUND OF THE INVENTION

In circuits having solid state controlled devices for passing load currents considerable heat is developed by the solid state controlled devices which has to be dissipated to maintain the solid state controlled devices within their operating range. Also, an inductive choke is usually provided in series with the solid state controlled devices to limit surge currents and to smooth the wave shape of the controlled current. The inductive chokes or saturable reactors provide a time delay to permit the silicon controlled rectifiers to become operative within its turn on current limit capability. Sufficient active area within the silicon controlled rectifier is then available to assume full load current at minimum heat dissipation. These units have in the past been constructed as separate pieces and have required many electrical interconnections and separate supporting framework. The units are usually large if satisfactory parameters are to be maintained. The inductive choke and the heat sinks are mounted separately on a chassis. A similar problem exists with rectifying power supplies having transformers. A great deal of effort has been expended to reduce the overall size of such apparatus and the number of pieces required in the assemblage of the components.

SUMMARY OF THE INVENTION

A current supply apparatus has a heat sink for supporting solid state devices and an inductive winding as a single piece of extruded aluminum with the solid state device passing current in series with the inductive winding.

An object of the invention is to provide a current supply that is simplified in the passage of current between the components and improves the heat dissipation from solid state devices.

Another object of the invention is to provide a current supply apparatus that combines the heat sink for solid state devices and the inductive winding as a single piece.

Another object of the invention is to provide a current power supply apparatus for passing current to solid state controlled devices with a minimum of wire and connections.

Another object of the invention is to provide an apparatus for controlling solid state controlled devices that has a low weight to current ratio.

Another object of the invention is to provide an apparatus for controlling solid state controlled devices that has a low space to current ratio.

Another object of the invention is to provide an apparatus for controlling a solid state controlled device with low internal resistance.

Another object of the invention is to provide a single piece heat sink and inductive winding that may be machined by programmed automated means.

Another object of the invention is to provide an apparatus for controlling solid state controlled devices that may be mounted exteriorly of a cabinet with a minimum of noise and a heat sink that is readily maintained in a clean condition for circulating convection currents.

Another object of the invention is to provide an apparatus for controlling solid state controlled devices that provides for easy dissipation of heat from the inductive winding directly to atmosphere and through heat dissipating fins.

Another object of the invention is to provide a simplified stable direct current output from an alternating current input.

Another object of the invention is to provide a simplified static switching solid state relay with no moving parts.

Another object of the invention is to provide a back to back heat sink-choke combination with alternating current phase control.

Another object of the invention is to provide a heat sink winding combination that can be used as an inverter.

Other and further objects and advantages will be apparent from the following description taken in connection with the drawings.

BRIEF DESCRIPTION OF THE DRAWINGS

FIG. 1 is a perspective view of the apparatus.
FIG. 2 is a front view of the apparatus.
FIG. 3 is an exploded perspective view of the apparatus.
FIG. 4 is a bottom view of the apparatus with the bottom insulating piece fragmentarily shown.
FIG. 5 is a top view of the apparatus.
FIG. 6 is a planar view of the inner side of the support member on the left side.
FIG. 7 is a fragmentary sectional view of the inductive choke taken along lines 7—7 of FIG. 4.
FIG. 8 is a fragmentary sectional view of the inductive choke taken along lines 8—8 of FIG. 2.

FIG. 9 is a longitudinal sectional view of an air core choke.

FIG. 10 is an exploded perspective view of a single phase center tap variable current power supply with a control circuit firing the solid state controlled rectifiers.

FIG. 11 is a longitudinal sectional view of a single phase uncontrolled rectifying power supply.

FIG. 12 is a fragmentary longitudinal sectional view of a single phase uncontrolled rectifying power supply with four rectifiers in bridge arrangement.

FIG. 13 is a fragmentary side view of a full wave uncontrolled direct current power supply.

FIG. 14 illustrates the circuit of the power supply shown in FIG. 11.

FIG. 15 illustrates the circuit of the power supply shown in FIG. 12.

FIG. 19 is a schematic diagram of two support members with a silicon controlled rectifier-diode full wave bridge rectifier.

FIG. 20 is a schematic diagram of an inverter with two support members having a silicon controlled rectifier on an electrically isolated insert and a rectifier.

FIG. 21 is a sectional view of another embodiment of a firing circuit mounting.

DETAILED DESCRIPTION

Figure 16:
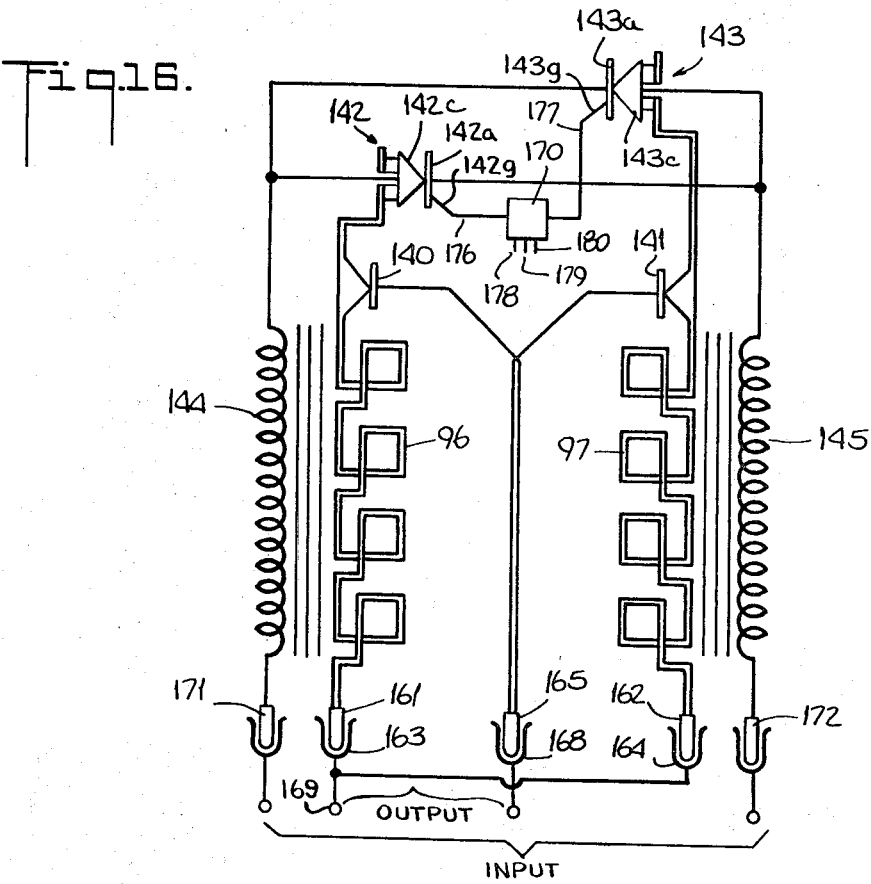
FIG. 16 illustrates a circuit of the controlled power supply shown in FIG. 10.

Referring to FIGS. 1 to 8 of the drawings, an alternating current controller is illustrated with two support members 20, 21 essentially comprising an inductive winding section 22 and a solid state controlled device section 23. The two single piece members 20, 21 are identical and comprise heat sinks 24, 25 and inductive windings 26, 27. The heat sink and inductive winding of a respective member is formed as a single piece of aluminum. The inductive windings of the two members are fastened together to form an integral structure. A ferromagnetic core 28 (FIGS. 3, 4, 6, 7 and 8) is provided passing through the windings 26, 27 to form the iron core choke.

The heat sink comprises U-shaped body portions 30, 31 (FIGS. 1, 3 and 5) with center walls 32, 32a and facing side walls 33, 34 and 35, 36. Cooling fins 37, 38 extend perpendicular from the outer surface of the U-shaped body portions and longitudinal to the walls to provide a large cooling surface and form longitudinally extending channels 39, 40 for passing cooling air. The U-shaped body portions form passages 41, 42 on the inside. The solid state controlled devices 43, 44 (FIGS. 1, 3 and 5) are mounted at approximately the midpoint of the center pieces and extend inwardly into the passages 41, 42.

The inductive windings 26, 27 (FIGS. 2, 3, 4, 6 and 7) are formed by four walls 45, 46, 47, 48 and 49, 50, 51, 52, three of which, 45, 46, 47 and 49, 50, 51, are extensions of the center and side walls. The fourth walls 48, 52 are on the side of the openings of the passages 41, 42. The passages extend through a respective winding. The inductive windings 26, 27 are made by cutting the four walls to form continuous generally square helical turns. Each member is entirely anodized to provide an electrical insulating coating to the turns and the heat sink. Contact then can be carried through the inductive windings into the heat sinks and to the solid state controlled devices. Thus the member in addition to functioning as a conductor of heat from the solid state controlled devices also functions to carry the main current being controlled by the solid state controlled device.

The windings 26, 27 are axially resilient and the turns are spaced when not compressed. The members 20, 21 are fastened together by four bolts 55, 56, 57, 58 (FIGS. 3, 6 and 8) passing through the upper and lower portions of winding 27 and threading in the insulated nuts 59 embedded in the upper and lower portions of the winding 26. An electrical insulating piece 60 (FIGS. 2, 3, 7 and 8) is positioned between the walls 48 and 52 to electrically isolate the two members. The insulating piece has two notches 61, 62 matching the notches 53 and 54 (FIGS. 3, 6 and 7) in the mating walls 48, 52. In addition to electrically isolating the two windings the insulating piece passes the bolts and compresses the winding so that the anodized turns are in contacting and force transmitting relation.

The ferromagnetic core 28 is formed by wrapping iron tape in a generally oval or rectangular configuration. The core is then severed and fitted into windings passing through the notches 53, 54, 61, 62. Spacers 63 (FIGS. 3 and 7) are preferably positioned between the separated portions of the core to provide a nonmagnetic space in the core. The core may be held together by a strap 64 wrapped around the core and secured by a clip 65 (FIG. 7), or may be adhered together by any suitable adhesive.

Main current prongs 67, 68 (FIGS. 1, 2, 3, 4, 6 and 7) are threaded into the windings 26 and 27 in the terminal edges of the walls 47 and 51, respectively. An impregnated laminated insulating piece 69 (FIGS. 3, 4 and 6) is fitted over the ends of the windings 26 and 27 and held in place by the prongs 67 and 68. The magnetic core 28 may then be potted by pouring silicon rubber into the windings 26 and 27.

On the walls 45, 51 are stud nuts 70 (FIGS. 1, 2, 3 and 4) with a printed board 71 of insulating material atttached to the nuts 70 by bolts 70a (FIG. 1) threaded therein and a phenolic casing 72 attached to the board by bolts 73. The casing contains a firing circuit (not shown) providing a firing pulse variable in phase to control the amount of current passing through the solid state controlled devices 43, 44. The board 71 may have on the side facing the windings a printed circuit forming a part of the firing circuit. The board has three prongs 74, 75 and 76 (FIGS. 2 and 3) extending in the same direction as the main current prongs 67, 68 for plugging into the main panel along with the prongs 67 and 68. The prongs 74, 75, 76 are connected to the firing circuit and receive the control signal from a preset board (not shown). Wire leads 77, 78 (FIGS. 2, 3 and 5) leading from the solid state controlled devices are attached to the terminals 79 and 80 on the board. The terminals are attached to the firing circuit to apply the firing pulses to the solid state controlled devices. The solid state controlled devices are cross connected by heavy duty leads 83, 84 (FIGS. 3 and 5) attached to terminals 85, 86 on the side walls 34, 35, respectively.

The phase controller is mounted on a chassis or main board (not shown) with the solid state controlled device section 23 above the inductive section 22 so that the controller is supported on the windings and the prongs. The fins 37, 38 extend vertically so that the air currents pass up through the channels 39, 40.

The members 20, 21 are made by extrusion. The fins 37, 38 and the center and side walls 32 to 36 and 48, 52 are extruded as a single continuous piece. The members are cut to length and the fins removed from the inductive section. The windings are then formed by cutting a continuous groove in the walls. In the solid state controlled device section 23 the walls 48 and 52 are removed to open one side of the passages 41 and 42 and form a space between the sections 23.

In FIG. 9 instead of the iron core choke an air core choke 122 is provided. The air core choke is similar to the iron core choke and has inductive windings 126 and 127 helically cut in the walls 128, 129, 130 and 131 and in the walls 132, 133, 134 and 135. The coils are separated by an insulating piece 136. Fastening means (not shown) extends through the walls 129 and 133 and 131 and 135 and the insulating member 136 to hold the coils together in a compressed condition. The air core windings are approximately twice as long as the windings of the iron core choke. The advantage of the air core choke is that it provides a noiseless induction.

In FIGS. 10 and 16 a single phase direct current power supply having a controlled primary current is illustrated with two support members 90, 91 similar to the support membersof the previous embodiments. The support members have inductive windings 96, 97, respectively, and heat sinks 94, 95, respectively. On the center walls 102, 103 of the heat sinks are rectifiers 140, 141 and solid state controlled rectifiers 142, 143 conductively connected to the heat sinks 94, 95, respectively, to pass the current passing through the inductive windings. The inductive windings 96, 97 form the secondaries to the primary windings 144, 145 on a respective inductive winding. The support members 90, 91 with the secondary windings 96, 97 are fastened together by four assembly bolts 147 passing through the one support member and threaded into the other. Insulated nuts 148 are embedded in the walls of the end portions of the windings. A spacer 149 is positioned between the primary windings 144, 145 and passes the assembly bolts 147 to hold the inductive windings in compressed relation. The spacer 149 has a portion positioned between the primary windings 144, 145 and two upper block portions 150, 151 and two lower block portions 152, 153 with spaces 154, 155 between the upper and lower block portions to correspond to the spaces 157a, 158a formed in the respective walls 157, 158 of the inductive windings 96, 97 for passing the iron core 159. The assembly bolts 147 pass through block portions 150 to 153. Thus the two support members 90, 91, the primary windings 144, 145 and the spacer 149 are held together as an integral unitary member.

An insulating member 160 is fastened to the lower ends of the inductive secondary windings 96, 97 to electrically isolate the support member 90, 91 from any chassis or panel on which the power supply is mounted. Terminal prongs 161, 162 may be fastened into the ends of the inductive windings to fit in sockets 163, 164 (FIG. 16) on a chassis or panel (not shown). These prongs are electrically connected to form one direct current output terminal. The sockets 163, 164 (FIG. 16) may be interconnected.

The rectifiers 140, 141 have similar terminals connected to the terminal prong 165 extending through the block portions 150, 152 on the spacer 149 to form the other output terminal. The prong 165 fits into socket 168 (FIG. 16) on a chassis or panel (not shown). An insulating terminal board 170 may be mounted on the upper and lower ends of the inductive windings 96, 97 and provided with two terminal prongs 171, 172 connected to a respective half of the primary windings 144, 145.

Figure 17:
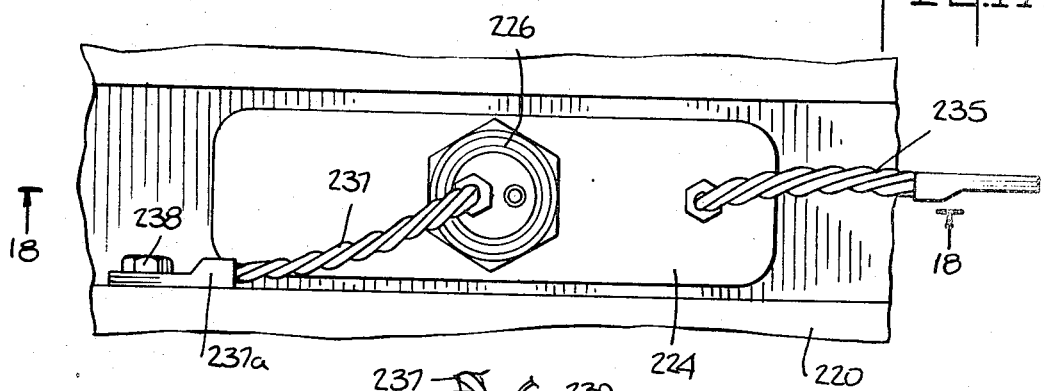
FIG. 17 is a plan view of heat sink having an insert electrically isolating a silicon controlled rectifier from the heat sink.
Figure 18:
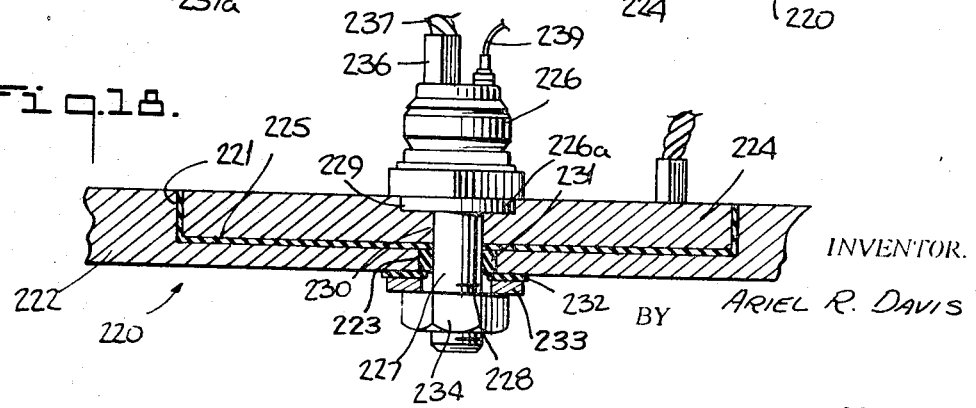
FIG. 18 is a sectional view along lines 18–18 of FIG. 17 of the heat sink insert mounted on a heat sink.

The solid state controlled rectifiers 142, 143 (FIG. 16) are mounted in an electrically insulated and heat conductive relation by the mounting means set forth in FIGS. 17 and 18 with the walls 102, 103 of the heat sinks 94, 95 (FIG. 10). The cathode 142c and anode 143a (FIG. 16), are connected to primary winding 144 and anode 142a and cathode 143c are connected to primary winding 145 to pass alternate halves of the main current. A firing circuit 175 (FIG. 13) is mounted on the terminal board 170 and is connected to the gates 142g, 143g by leads 176, 177. Terminal prongs 178, 179, 180 provide a control signal for varying the phase of the firing pulses and the main current. The current in the secondary windings is thus controlled and varied in accord with the phase of conduction of the primary windings 144, 145.

In FIGS. 11 and 14 two embodiments are illustrated of the two diode full wave rectifier and the four diode full wave rectifier. In FIG. 11 a longitudinal sectional view of the two diode full wave rectifier illustrates the diodes 140 and 141 mounted in the walls 102 and 103 with the similar terminal connected to a common terminal 165. A small terminal board is mounted on the side of the secondary windings 96 and 97 in a similar manner to the board 170, and has a common terminal 181 for connecting the adjacent leads 181a, 181b (FIG. 14) of the primary windings 144, 145. The opposite ends of the primary windings are connected to terminal prongs 182 and 183 mounted on the board 188. The adjacent ends of the secondary windings 96, 97 have the prongs 161, 162 connected to sockets which are electrically interconnected in a similar manner to that of the embodiment of FIGS. 10 and 16. Thus a full wave direct current appears across the output sockets 168 and 169.

In FIGS. 12, 13 and 15 a full wave bridge rectifier is shown in which diodes 140 and 141 have the similar terminal connected to the terminal 165. The other diodes 190 and 191 have their similar terminals connected by leads 192 and 193 connected to the terminal prong 196 which extends through the block portions 151 and 153 of the spacer 149 of the embodiment of FIG. 10. The lower end of the secondary windings 96, 97 may be electrically connected by a strap 197 (FIG. 15). Thus the output appears across the terminal prongs 165 and 196. The primary windings 144 and 145 are interconnected at the common terminal 181 and provided with power across the terminals 182, 183 mounted on the terminal board 188.

In the embodiments of FIGS. 10 to 16 single phase power supplies have been described. A three phase power supply may be provided by an additional support member provided with a primary winding and fastened to one of the other support members with a spacer therebetween. These may be connected on a delta or Y connection and each heat sink provided with one or two rectifiers depending upon the type of circuit desired. A booster winding may be connected to the primaries to compensate for low line voltage.

The foregoing circuits can provide for a power supply that provides a 3 volt output at 200 amps. of direct current. In these low voltage direct current circuits the diodes are preferably two high current silicon rectifiers. In the embodiment of FIG. 10 two small silicon controlled rectifiers may be used to control the output. These low voltage high amperage power supplies should preferably have a very low internal resistance to keep the voltage drop to a minimum. This is achieved by the reduction in the number of leads and connections made in passing current through the apparatuses. This helps in maintaining the output constant with variations in load. In the embodiment of FIG. 10 the silicon controlled rectifiers permit the control of the regulation of the low voltage high current output.

In FIGS. 17 and 18 a modification of the mounting of a silicon controlled rectifier on a heat sink 220 is illustrated in which the silicon controlled rectifier is electrically isolated from the heat sink while being in heat conductive relation with the heat sink. The heat sink 220 is the same as heat sinks 24, 25, 94, 95 except that a recess 221 is cut in the center wall 222. The recess is rectangular in shape and has rounded corners. A hole or opening 223 is centrally positioned in the recess and extends through the wall 222. An insert 224 of the same shape as the recess is made of aluminum or other heat and electrically conductive material has an insulating coating or layer 225 on the inner side and around the edges. The insulating layer 225 electrically separates the insert 224 from the heat sink 220 while permitting conduction of heat from the insert to the heat sink. The silicon controlled rectifier 226 has a fastening stem 227 with an exterior thread 228. The circular portion 226a with the base of the rectifier fits in the circular recess 229 in the insert 224 in electrical conductive relation with the insert. The stem 227 extends from this circular portion 226a through the opening 230 in the insert and the washer 231 of electrically insulating material. The washer 231 isolates the stem from wall 222. A second washer 232 is flat and fits around the opening 223. This washer may be made of mica. The lock washer 233 engages this second flat washer under pressure from the nut 234. Thus the silicon controlled rectifier 226 is securely fastened to the heat sink 220 with excellent heat transfer characteristics while being electrically isolated. The insert 224 has at one end a braided cable 235 attached to the insert for passing current to the base.

As illustrated in FIG. 17 the cathode 236 is attached to the heat sink 220 by the cable 237, the lug 237a and fastening means 238. The gate is connected by lead 239 to a firing circuit (not shown). Thus the cathode of the solid state device is electrically connected to the support member with the solid state device in heat conductive relation with the heat sink of the support member.

In FIG. 19 is a conventional bridge rectifier for conversion of alternating current to direct current. The heat sinks 259, 260 are sectionally illustrated to show the silicon controlled rectifiers and rectifiers. The chokes 243, 244 are electrically isolated by the insulating member 258 and in series with the bridge network of the silicon controlled rectifiers 250, 251 and rectifiers 252, 253. The controlled rectifiers are in adjacent legs to control the current. The alternating input is applied to prongs 254, 255 in the chokes 243, 244 respectively. The direct output appears at terminals 261, 262.

An inverter is shown in FIG. 20 with the heat sinks 270, 271 sectionally illustrated. The chokes 272, 273 are separated by an insulating member similar to member 149 of FIG. 10. The chokes have prongs 275, 276 and the insulating member has prongs 277, 278. On the heat sinks are silicon controlled rectifiers 226, 280 and rectifiers 281, 282 connected across a respective silicon controlled rectifier. Direct voltage is applied across prongs 275, 276 and alternating voltage appears across prongs 277, 278.

The silicon controlled rectifier 226 has the anode connected to prong 277 through the insert 224 and cable 235 and the cathode is connected to the choke 272 by cable 237. The cathode of silicon controlled rectifier 280 is connected by lead 283 to the prong 277. The prong 278 is connected to prongs 275, 276 by capacitors (not shown). The gates of the silicon controlled rectifiers are connected to the firing circuit by leads 239, 284. It is thus seen a conventional inverter circuit is readily adapted to the support members and silicon controlled rectifiers to provide a compact high capacity inverter.

In FIG. 21 a fragmentary sectional view of another embodiment of the mounting of a firing circuit on the support member and the mounting of the support member on a chassis is shown. A mounting 200 has an outer rectangular wall 201 with an intermediate flange 202 held on the wall to support the apparatus. The terminal prongs 203, 204 threaded in the walls of the terminal portions extend through the mounting for plugging into the chassis. The walls have exterior lugs 205, 206 for fastening the mounting 200 to a chassis or panel. The firing circuit is mounted on the plate 207 fitting in and attached to the bottom of the mounting and housed in the chamber 208. Prongs 209, 210, 211 are mounted on the plate for connecting the firing circuit to an input control signal. The firing transformer 212 is connected to the solid state controlled devices by leads 213, 214 extending through tubes 215, 216 in the embedding silicone rubber.

The iron core and the air core chokes of the embodiments of FIGS. 1 to 8 and FIG. 9 protect the silicon controlled rectifiers against surge currents and also reduce the steepness of the solid state controlled devices when turned on by a firing pulse. The windings producing the choke delay the rise of current in the case of overload currents and restrict the peak values so that the circuit breakers may be tripped before the solid state controlled devices are damaged. The saturable reactor formed by the winding and core greatly reduces the switching dissipation in the solid state controlled devices. The time delay permits the solid state device to assume current conducting condition within its current limit capability. Sufficient active area is available to assume full load current at minimum dissipation.

The core can be made of U-shaped silicon steel stampings or made as a tape wound core which is cut into two U shapes after winding. The core can also be made of powdered iron or powdered ferric moulded into a U-shape. If the laminated cores are assembled without an air gap they become a non-linear inductor or saturating reactors. But if the cores are assembled with a small airgap linear reactors are formed. The iron core, as previously mentioned, preferably has a nonmagnetic airgap to slow the rate of rise of the current on firing. The two halves of the iron core may be spaced by a .006" mica and, as previously mentioned in the specification, the core can be potted in a rubberlike potting compound, such as silicon rubber, to reduce the noise and vibration.

A support member is formed by extruding aluminum through a die. The fins are then removed from the winding section and the turns of the winding are formed by milling, or grinding progressively along the length of the winding section to form a spiral-like winding and rectangular configuration formed by the walls. A circular saw is positioned perpendicular and transverse to the support member with the center of the saw above the center of the wall to be cut. The saw is at a slight angle to a plane perpendicular to the wall at its midpoint. The circular saw is lowered to progressively cut the wall in both directions from the center. The circular saw should have a diameter so that the inner and outer edges are intersected by the saw at the same time. By the successive cutting of the walls a spiral-like winding is formed.

The support member including the winding is anodized after being deburred and degreased and then heated up to about 400° F. After the extrusion is anodized it may be heated up to about 400° F. and then coated with a powdered epoxy in dust form agitated by air. This provides a tough permanent insulating coating to the surface of the support member. The contacting anodized side surfaces of the winding when compressed together provide a heat flow from coil to coil to the fins on the heat sink. Instead of anodizing the windings may be insulated by filling an epoxy cement with small glass spheres of .004" to .005 diameter. These spheres act as spaces to keep the coils apart. The epoxy fills in and insulates the winding.

One of the basic features of the apparatus is the great reduction in electrical leads and connections. In the case of the embodiment of FIGS. 1 to 8 the current entering the prongs threaded into the bottom of the support members passes through the inductive windings into the heat sink and to the rectifiers or the solid state controlled devices without any further connections. This clearly reduces the internal electrical connections in the dimmer. The internal connections are objectionable since they are a possible source of failure because of corrosion, galvanic action, heat. In the embodiments of FIGS. 1 to 9 the main lead from the silicon controlled rectifiers is relatively short and connected by suitable means to the side walls 34 and 35 of the other support member. These leads are relatively short and the connections to the side walls may be of the highest quality. The other connections of the solid state controlled devices to the firing circuit do not carry the main current load and are, therefore, not subjected to the objections of the passing of current through contacting surfaces.

Another feature of the support members is that heat is directly radiated from the outer surfaces of the windings and that heat is conducted longitudinally along the support members for dissipation through the fins.

In addition to reducing the number of connections the total weight of the dimmer as shown in FIGS. 1 to 8 is substantially reduced, rendering the unit more versatile in the location where it can be mounted. Also, the cost of construction of the unit is considerably reduced over the presentd immers, and the elimination of many of the wires and the combining of the choke with the heat sink greatly reduces the overall dimensions of the unit.

A particular feature of the support member is the dissipation of heat. The cooling fins on the outside of the heat sink exposed to the air can easily be cleared of dirt and debris so that the circulating conduction air moves in contiguously to the surfaces of the heat sink. The cooling fins may extend down along the winding or they may be completely removed, as illustrated in the drawings. The exposure of the winding to the air also increases the heat dissipation.

The apparatus may be used in wide variety of current control devices such as switching units for connecting and disconnecting circuits, as inverters or converters performed by other types of electrical apparatus, as choppers and rectifiers and as other types of electrical apparatus adaptable solid state controlled rectifier circuitry.

Various modifications and changes may be made in the apparatuses as described without departing from the invention as set forth in the appended claims.

I claim:

1. Apparatus for controlling an alternating load current comprising first and second load terminals, solid state controlled means, firing circuit having lead means connected to said solid state controlled means for varying the time of firing of said solid state controlled means to control the amount of load current passed between said first and second load terminals, a wall having inner and outer surfaces forming a tubular-like member with a main longitudinal axis, a cut through and around said wall at a slight angle to a plane normal to the main axis to longitudinally space loops of said cut to form a portion of said wall into a continuous winding of a plurality of turns having side surfaces on each side facing the side surfaces of adjacent turns with adjacent surfaces electrically isolated for solely passing current serially through said turns, said wall having a terminal portion at one end with said first load terminal and a longitudinal extending portion at the other end of said winding and electrically connected in series with said winding, means for mounting said solid state controlled means on said longitudinal wall extension and electrically connected thereto in series with said winding and wall extension and said second load terminal for controlling load current in response to said firing circuit.

2. Apparatus as set forth in claim 1 wherein said inner outer and side surfaces have an electrical insulating coating to electrically isolate said turns.

3. Apparatus as set forth in claim 1 wherein said longitudinal extending portion has cooling fins mounted on said outer surface and extending longitudinally thereto to dissipate heat from said wall.

4. Apparatus as set forth in claim 1 wherein a second solid state controlled means and a second wall is provided having second inner and outer surfaces forming a second tubular-like member with a second main longitudinal axis, a second cut is provided through and around said second wall at a slight angle to a plane normal to the second main axis to longitudinally space second loops of said second cut to form said second wall into a second continuous winding of a plurality of turns having second side surfaces on each side facing side surfaces of adjacent turns with adjacent side surfaces electrically isolated for solely passing current serially through said turns, said second wall having a second terminal portion with said second load terminal at one end and a longitudinally extending portion on the other end, second means for mounting said second solid state controlled device mounted on said second longitudinally extending wall portion and having first and second main leads connecting said first solid state controlled means to said second wall portion and said second solid state controlled means to said first wall portion to electrically connect said windings and wall portions in series for controlling alternating portions of a load current in response to said firing circuit.

5. Apparatus as set forth in claim 4 wherein said fastening means are provided for connecting said walls together at said windings.

6. Apparatus as set forth in claim 5 wherein insulating means are provided for electrically isolating said first and second windings and for holding said windings in compressed relation in cooperation with said fastening means.

7. Apparatus as set forth in claim 6 wherein block means are provided on said insulating means and prong means are mounted therein for insertion in socket means.

8. Apparatus as set forth in claim 6 wherein an iron core is provided extending through said windings.

9. Apparatus as set forth in claim 8 wherein said first and second longitudinally extending wall portions have longitudinally extending openings facing one another and extending to said first and second windings, and said iron core is formed in two parts for insertion in opposite directions into said windings and having means for securing said parts together.

10. Apparatus as set forth in claim 4 wherein said firing circuit is mounted on said walls.

11. Apparatus as set forth in claim 10 wherein said firing circuit is mounted on the side of said first and second windings.

12. Apparatus as set forth in claim 1 wherein said means for mounting said solid state controlled means comprises a metal member having a surface and an electrical insulating coating engaging one of said surfaces on said wall, said solid state controlled means mounted on said metal member in heat and electrical conductivity therewith and means for securing said metal member and said solid state controlled means to said wall in electrical isolation therewith by means of said coating for passing heat to said wall from said metal member.

13. Apparatus as set forth in claim 12 wherein there is a conductive member attached to said metal member for connecting the electrode of said solid state means in electrically conductive relation with said metal member to another element other than said wall on which said metal member is mounted.

14. Apparatus as set forth in claim 4 wherein said first solid state controlled means is a silicon controlled rectifier and said means for mounting said first silicon controlled rectifier on said first wall comprises a metal member having a surface and an electrical insulating coating engaging one of said surfaces on said first wall, said solid state controlled means mounted on said metal member in heat and electrical conductivity therewith and means for securing said metal member and said solid state controlled means to said wall in electrical isolation therewith by means of said insulating coating and said second solid state controlled means is a rectifier.

15. Apparatus for providing voltage and current comprising first and second electrically conductive members having first and second tubular walls with first and second bores having a main longitudinal axis, first and second cuts through and around said walls at a slight angle to planes normal to a respective main axis to longitudinally space loops of said cuts to form portions of said first and second walls into first and second continuous windings of a plurality of turns having their respective side surfaces facing the side surfaces of respective adjacent turns, said side surfaces having first and second electrical insulating means therebetween to electrically isolate said turns of a respective winding for solely passing current serially through said turns of a respective winding while transmitting load forces and heat through the electrically isolated side surfaces, said first and second walls having first and second terminal portions at one end and first and second longitudinally extending portions at the other ends of said windings and electrically connected as a single piece in series with said first and second windings respectively, spacer means between said first and second windings having fastening means for holding said first and second electrically conductive members together and said windings in compressed relation, a ferromagnetic core in said bores to provide a magnetic path for the flux created by currents passing through said windings, first and second primary windings around said first and second windings for providing an alternating current to induce an alternating current in said first and second windings, first and second solid state devices mounted in said first and second longitudinal extending portions in electrically conductive relation therewith to alternately pass current from said first and second windings respectively.

References Cited

UNITED STATES PATENTS

| | | | |
|---|---|---|---|
| 2,756,358 | 7/1956 | Johnson | 336—61 X |
| 2,947,957 | 8/1960 | Spindler | 336—61 |
| 3,131,331 | 4/1964 | Ray | 336—192 X |
| 3,150,339 | 9/1964 | Wilska | 336—61 |

J D MILLER, Primary Examiner

A. D. PELLINEN, Assistant Examiner

U.S. Cl. X.R.

307—156; 317—234; 321—8; 323—100; 336—61, 223